H. O. HAMMER.
AUTOMATIC SCREW MACHINE.
APPLICATION FILED SEPT. 17, 1917.

1,324,249.

Patented Dec. 9, 1919.
7 SHEETS—SHEET 4.

H. O. HAMMER.
AUTOMATIC SCREW MACHINE.
APPLICATION FILED SEPT. 17, 1917.

1,324,249.

Patented Dec. 9, 1919.
7 SHEETS—SHEET 5.

Witnesses:
C. E. Wessels.
B. J. Richards

Inventor:
Hans O. Hammer,
By Joshua R. H. Potts
his Attorney.

H. O. HAMMER.
AUTOMATIC SCREW MACHINE.
APPLICATION FILED SEPT. 17, 1917.

1,324,249.

Patented Dec. 9, 1919.
7 SHEETS—SHEET 7.

UNITED STATES PATENT OFFICE.

HANS O. HAMMER, OF CHICAGO, ILLINOIS, ASSIGNOR TO SAMUEL OLSON & CO., OF CHICAGO, ILLINOIS, A CORPORATION OF ILLINOIS.

AUTOMATIC SCREW-MACHINE.

1,324,249.   Specification of Letters Patent.   Patented Dec. 9, 1919.

Application filed September 17, 1917. Serial No. 191,763.

*To all whom it may concern:*

Be it known that I, HANS O. HAMMER, a citizen of the United States, and a resident of the city of Chicago, county of Cook, and State of Illinois, have invented certain new and useful Improvements in Automatic Screw-Machines, of which the following is a specification.

My invention relates to improvements in automatic screw machines, especially adapted for making screws, bolts, nuts and the like, and has for its object the provision of an improved construction of this character, which is simple and efficient in use.

The invention consists in the combinations and arrangements of parts hereinafter described and claimed.

The invention will be best understood by reference to the accompanying drawings forming a part of this specification, and in which, Figure 1, is a partial side view of a machine embodying the invention, Fig. 2, a top plan view of the same, Fig. 3, a detailed section of a tool head employed in the machine, Fig. 4, an end view of the machine, Fig. 5, a detailed elevation of a modified form of construction for operating the tool head, Fig. 6, an enlarged section taken on line 6—6 of Fig. 5, Fig. 7, a transverse vertical section of the machine, Fig. 8, another transverse vertical section of the machine, Fig. 9, an enlarged longitudinal section taken through a hollow work holding shaft employed in the machine, Fig. 10, an enlarged section taken on line 10—10 of Fig. 9, Fig. 11, an end view of said shaft, Fig. 12, an enlarged detail section of a portion of the mechanism of said shaft, Fig. 13, an end view corresponding with Fig. 12, Fig. 14, a vertical transverse section of the machine, Fig. 15, another vertical transverse section of the machine, Fig. 16, another vertical transverse section of the machine, Fig. 17, another vertical transverse section of the machine.

The preferred form of construction as illustrated in the drawings comprises a suitable frame or standard 20, having a master shaft 21 extending longitudinally therethrough, said master shaft being driven by means of a worm wheel 22 meshing with a worm 23 on a countershaft 24. Shaft 24 is connected by means of a train of gears 25 with a driving shaft 26 provided with a cone pulley 27 for operating the machine. Drive shaft 26 carries two concentrical beveled gears 28 and 29 meshing respectively with beveled gears 30 and 31 loosely mounted on a hollow work holding and feeding shaft 32 as indicated. At one end the shaft 32 is provided with the usual chuck or work holder 33 operatively connected with operating bell cranks 34 operable from a cone 35 in the usual manner. Cone 35 is operatively connected with a fork 36 on a slide block 37 carrying a roller 38 coöperating with the usual cam blocks 39 on the cam drum 40 on the master shaft 21. The shaft 32 is also equipped with the usual feed tube 41 carrying an operating head or collar 42 connected with a fork 43 on a reciprocating block 44, carrying a roller 45 coöperating with the usual cam blocks 46 on cam drum 40, the arrangement being such as to periodically feed a suitable length of work, such as an hexagonal rod 32' through the hollow shaft 32 as is usual in machines of this character. The hollow shaft 32 and the mechanism for feeding the work rod 32' therethrough is an old and well known mechanism in this art and no claim is made thereto, except in so far as the same coöperates with other novel features of the machine.

The gears 30 and 31 are arranged to periodically drive the shaft 32 through the medium of a shiftable clutch 47 mounted on said shaft between said gears and feathered or splined to the shaft, so that longitudinal shifting of said clutch throws one gear into operative driving connection with said shaft and the other gear out of such driving connection, thus reversing the direction of rotation of the shaft and also changing the speed of rotation thereof, the gear 30 meshing with a comparatively large driving gear and the gear 31 meshing with a comparatively small driving gear as indicated. Clutch 47 is operated by means of a lever 48 operatively connected therewith at its upper end and carrying a cam roller 49 at its lower end, coöperating with oppositely disposed adjustable cam blocks 50 on a cam disk 51 on shaft 21. By this arrangement it will be observed that the shaft 32 will be periodically reversed in direction of rotation and that the speed of rotation in one direction will be very much greater than that in the other, the machine being designed to utilize the slow speed of rotation of the shaft 32 during the active operations of the machine requiring slow speed and the high speed of said shaft during the idle and return movements thereof, or during the operations where high speed may be employed, thus economizing time and increasing the output of the machine.

In the opposite end of the machine a pair of reciprocating rods 52 and 53 are mounted, a tool head 54 being mounted to rotate freely on the rod 52 and abut against the end of rod 53. Tool holders or posts 55 and a stop or gage 56 are mounted on the tool head 54 to swing into and out of operative relation with the work holder or chuck 33 on shaft 32, at which time they also abut against the end of rod 53, which thus serves to directly and positively resist the strains thereon. The rods 52 and 53 are rigidly connected by means of a cross head 57 secured thereto and extending downwardly therefrom, said cross head carrying at its lower end a cam roller 58 coöperating with suitable cam blocks 59 and 60 on the periphery of a cam wheel 60′ fixed to master shaft 21, said cam blocks being so arranged as to cause movement of the tool head 54 up to the work holder 33 during the slow rotations of shaft 33 and withdraw said tool head 54 during the rapid rotations of shaft 32.

Suitable guide rails 61 are mounted on brackets 62 at the sides of the frame 20, and the tool head 54 is provided with guide slots 63 arranged to ride upon the guide rails 61 during the major portion of the movements of the tool head 54. A gear or pinion 64 is loosely mounted on the rod 52 and rotatable in the frame of the machine to prevent its movement with said rod, said gear carrying a lock pin 65 adapted to enter holes 66 provided in tool head 54. Gear 64 meshes with a rack bar 67 connected at its lower end by link 68 with a spring held bell crank 69 pivoted on the frame of the machine and provided with an arm 70 set in the path of a plurality of cam blocks 71 on a cam disk 71′ fixed to the master shaft 21. The arrangement is such that at the end of each withdrawal of the tool head 54 from the work chuck 33 the tool head rides off of the outer ends of the guide rails 61, thus freeing the tool head for rotation, and at the same time effecting engagement between the pin 65 and one of the holes 66. The cam blocks 71 are so adjusted on the disk 71′ that at this time one of said cam blocks operates the bell crank 69 to cause rotation of gear 64 through a portion of a revolution, in the form of the machine illustrated a revolution of 90 degrees. This serves to shift one of the tool holders 55 or the stop or gage member 56 out of operative relation with the work chuck 33 and another in to such relation. Whereupon one of the cam blocks 60 comes into operation to force the tool head 54 on to the guides 61 and into operative relation with the work chuck 33, thus freeing the tool head from the gear 64 and bringing a new tool into operation as will be readily understood. Upon release of the gear 64 from the tool head 54, the spring of the bell crank 69 returns the gear 64 and coöperating parts to original position ready for the next operation. Various tools may be mounted in the tool holders 55 and thus a large variety of work done by the machine as will be readily understood by those skilled in this art, the tools indicated being those required for the making of ordinary nuts.

Arranged under the work chuck 33 is a transversely reciprocating tool block 72 mounted in suitable guide ways in a saddle 73 traversing the frame of the machine. The block 72 is provided with tool posts 74 and 75 positioned on opposite sides of the work chuck 33, but in operative relation therewith. Depending operating levers 76 and 77 are mounted in the frame of the machine at opposite ends of the block 72 and are provided with adjustable set screws 78 bearing against the ends of said block. A cam disk 78 is fixed to the master shaft 21 between the lower ends of the levers 76 and 77 as indicated, the cam disk 79 being provided with a cam block 80 coöperating with the lever 76 and cam blocks 81 and 82 coöperating with the lever 77, the arrangement being such as to periodically reciprocate the tool block 72 to throw the tools in the tool posts 74 and 75 alternately and periodically into operative relation with the work in the work chuck 33. In the form of the machine illustrated the tool post 74 is equipped with a tool adapted to trim the curved face of a nut and the tool post 75 with a tool adapted to cut off the finished nut 81 from the rod 32′ at the completion of the active operation of the tool, the cam blocks 81 and 82 being positioned and timed to effect these operations in proper relation with the other parts of the machine, the tool in the tool holder 75 being thrown into operation as the last active operation of the machine and the tool in the tool holder 74 being thrown into operation concurrently with the operation of the first tool on the tool head 54.

The cam blocks on the cam drum 40 are so positioned and timed with reference to the other parts of the machine that immediately upon the completion of the operation of all of the tools, and at the time the stop or gage 56 is in operative position, a suitable length of the work bar 32' is fed forwardly through the shaft 32 and becomes clamped in position in the work chuck 33 as is usual in machines of this character.

The machine disclosed is a simple and efficient one for the purpose, capable of operation at comparatively high speed and therefore capable of producing a large output. The specific form and arrangement of the parts is a simple and efficient one for the purpose and adds to the durability and efficiency of the machine.

Figure 1:
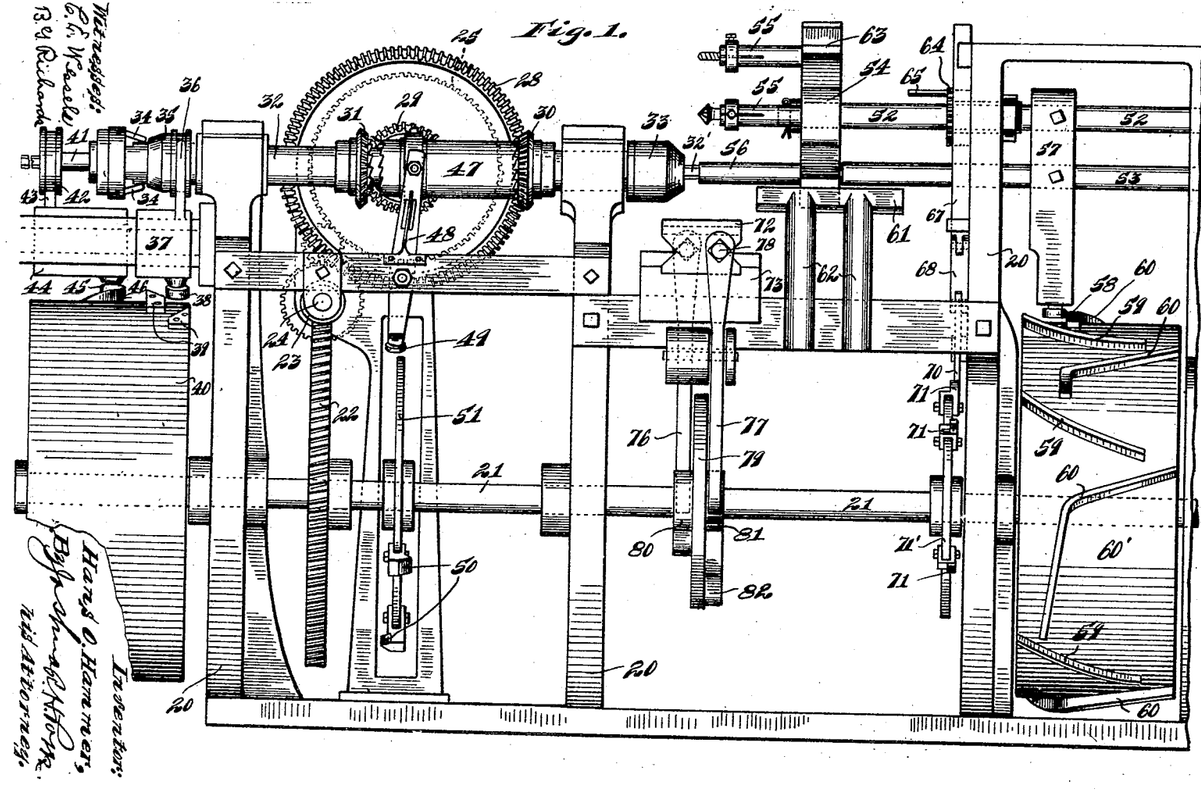
Figures 2, 3:
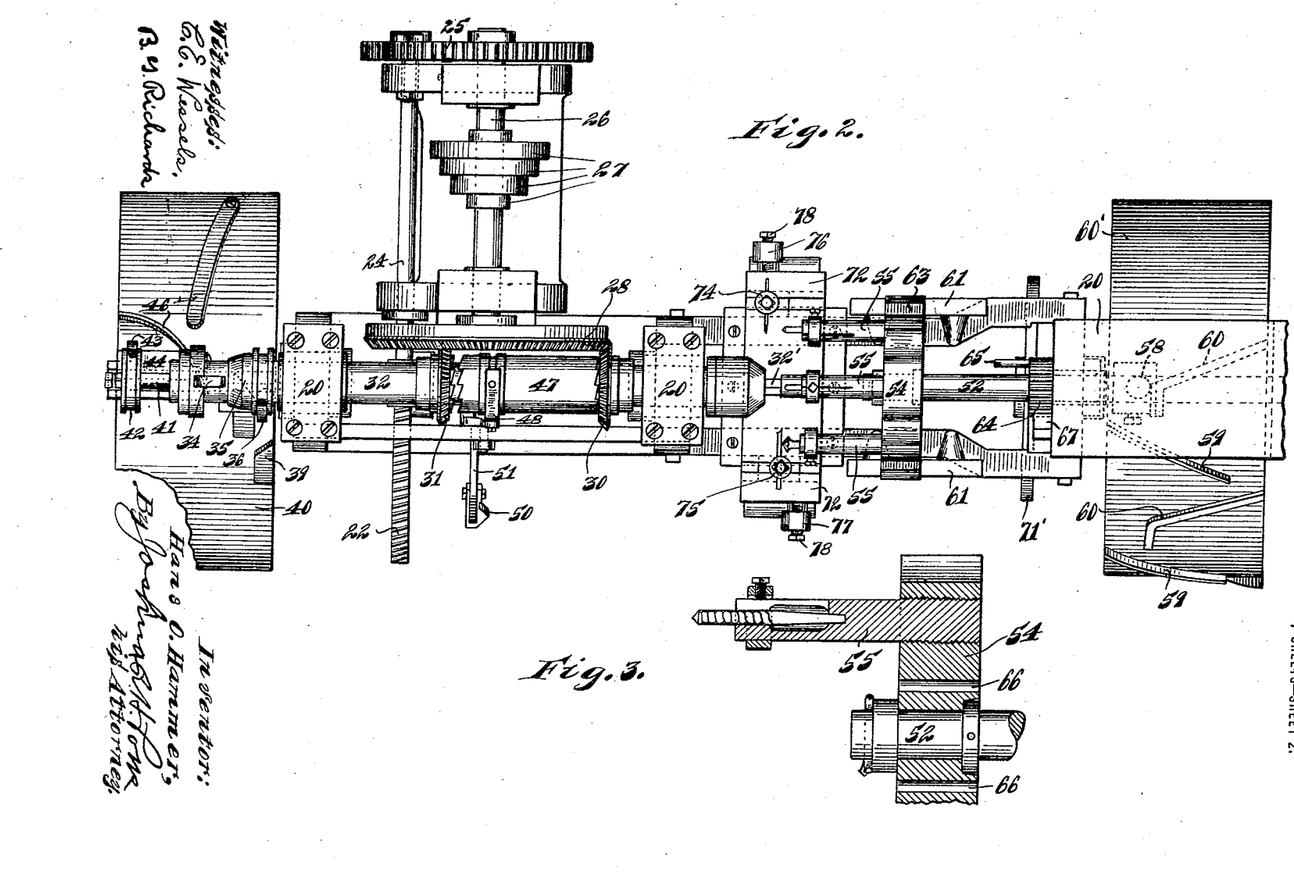
Figure 4:
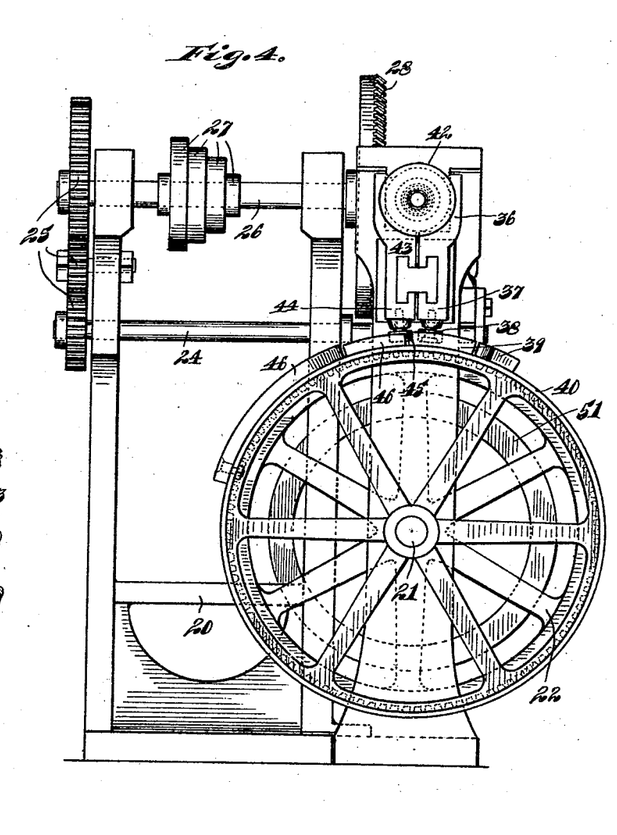
Figure 5:
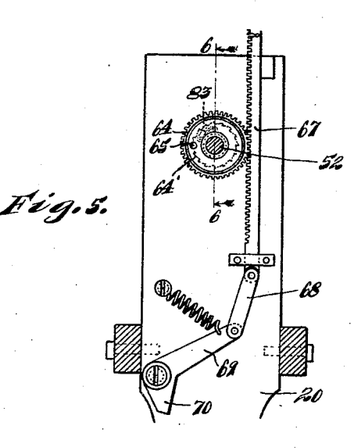
Figure 6:
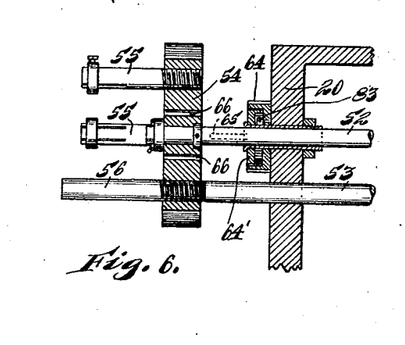
Figure 7:
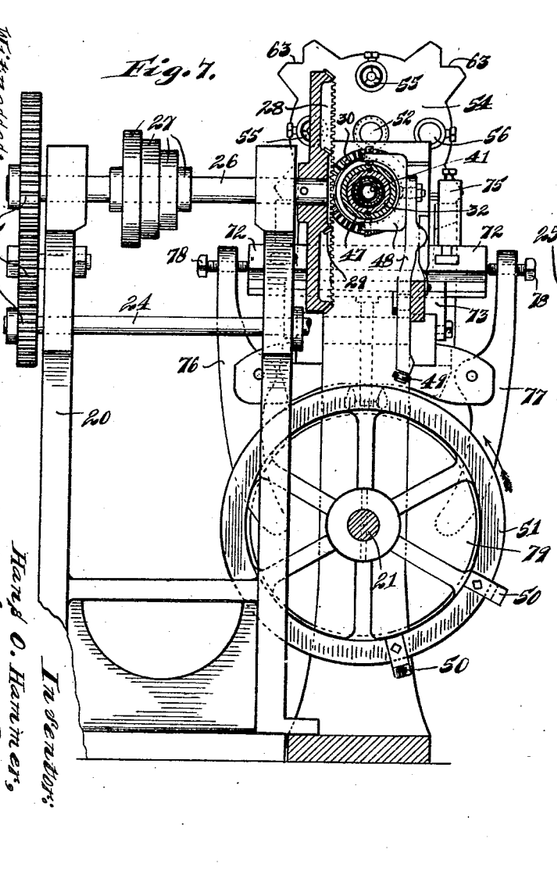
Figure 8:
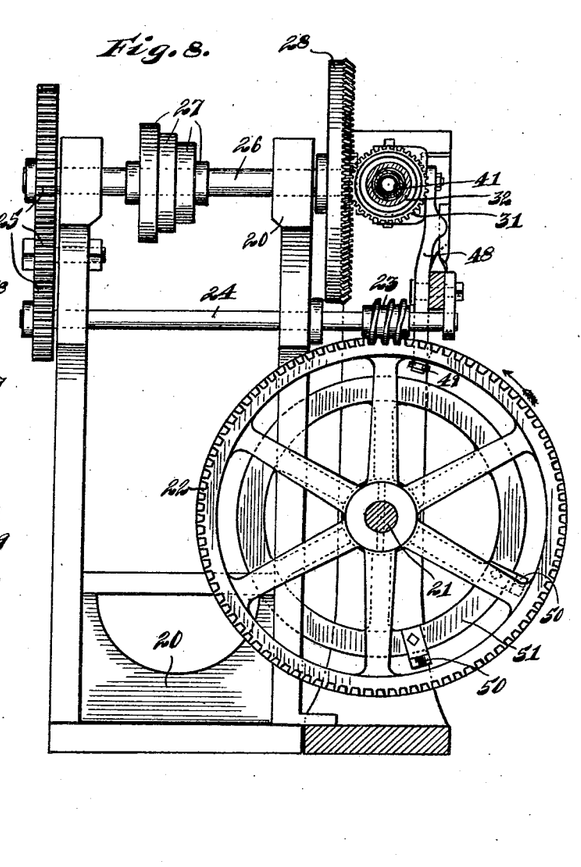
Figures 9, 10, 11:
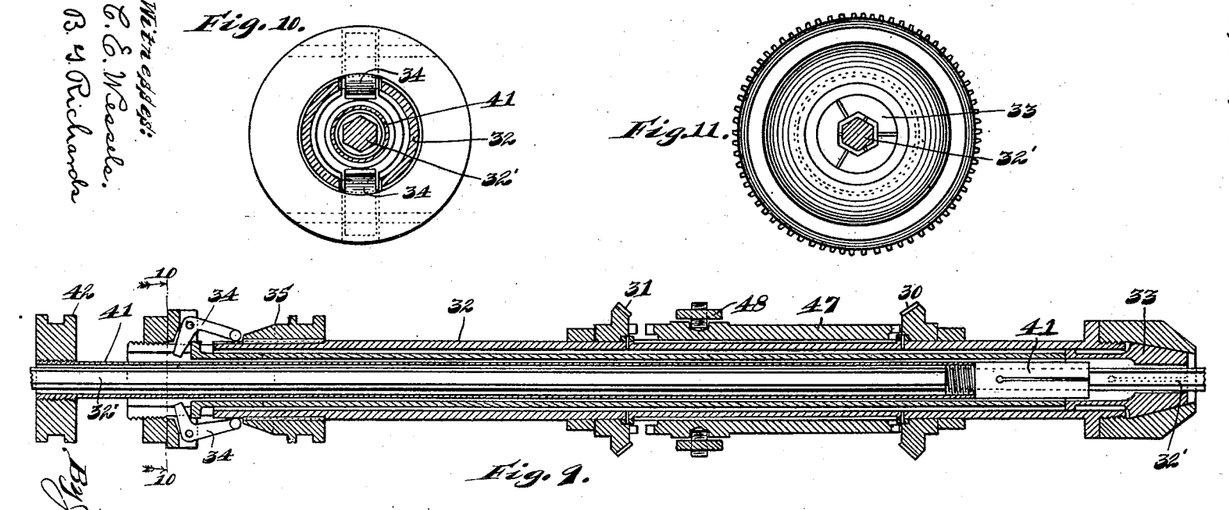
Figure 11:
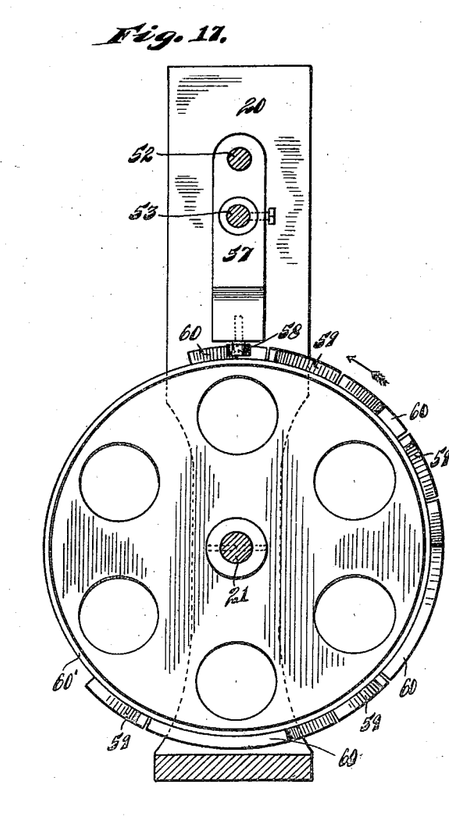
Figure 12:
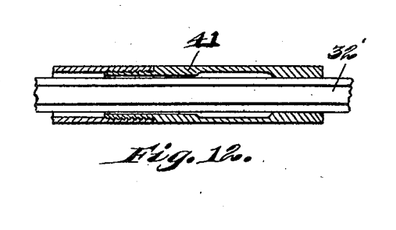
Figure 13:
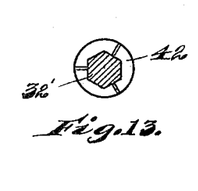
Figure 14:
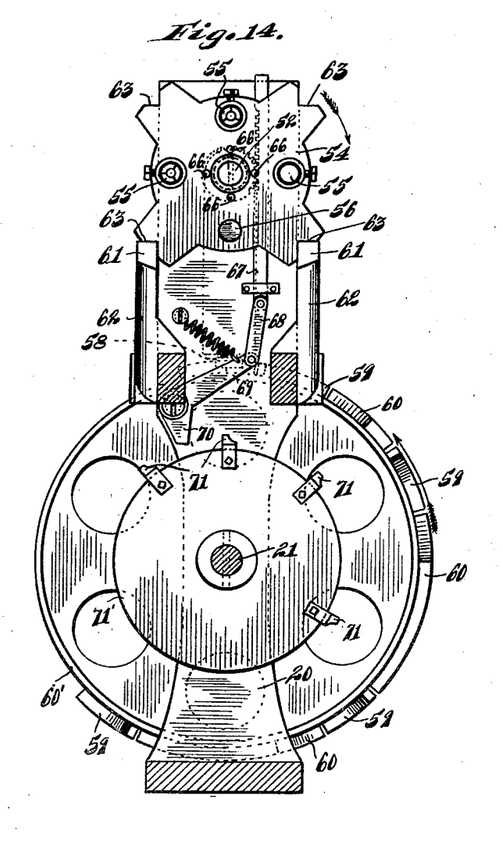
Figure 15:
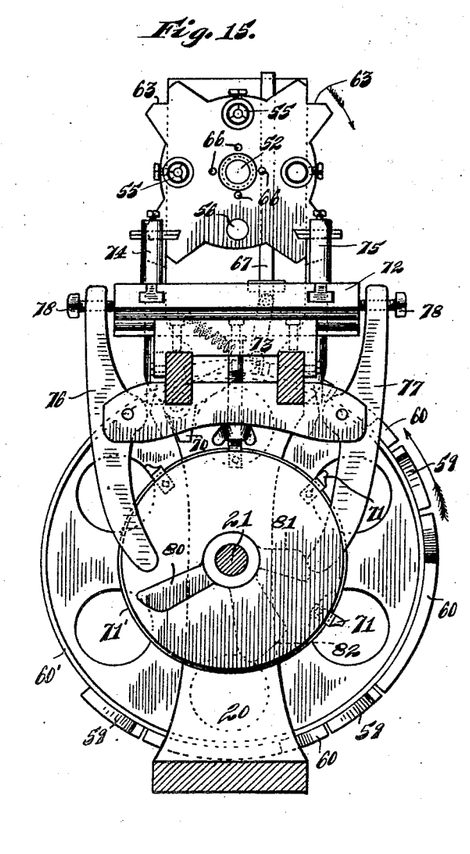
Figure 16:
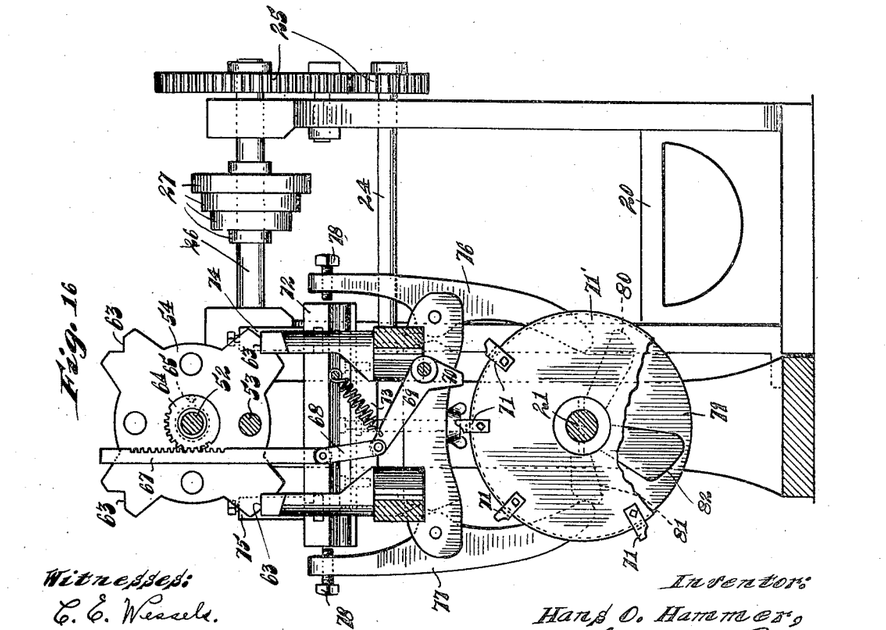

In Figs. 5 and 6 I have illustrated a slightly modified form of construction for operating the tool head. In this arrangement the gear 64 is provided with teeth on its entire periphery and is connected by means of a pawl and ratchet mechanism 83 with a block 64' carrying the pin 65 for engagement with the openings 66 in the tool head 54, and by which arrangement complete or various rotations of the tool head are permitted, thus adapting the construction to further range of use.

While I have illustrated and described the preferred form of construction for carrying my invention into effect, this is capable of variation and modification without departing from the spirit of the invention. I, therefore, do not wish to be limited to the precise details of construction set forth but desire to avail myself of such variations and modifications as come within the scope of the appended claims.

Having described my invention what I claim as new and desire to secure by Letters Patent is:

1. A machine of the class described comprising a rotatable and reciprocable tool-head; a plurality of tool holders on said head; a work holder in operative relation with said work; means for periodically rotating said head; and means for periodically reciprocating said head including an abutment substantially in alinement with the operating tool, substantially as described.

2. A machine of the class described comprising a rotatable and reciprocable tool head; a plurality of tool holders on said head; guides on said frame and head arranged to guide the latter during its reciprocations and release it for its rotations; a work holder in operative relation with said head; means for periodically rotating said head; and means for periodically reciprocating said head including an abutment, substantially in alinement with the operating tool, substantially as described.

3. A machine of the class described comprising a frame; a rotatable and reciprocable tool head on said frame; a plurality of tool holders on said head; guides on said frame, there being notches in the edges of said head, arranged to ride upon said guides to guide the head during its reciprocations and release it for its rotations; a work holder in operative relation with said head; means for periodically rotating said head; and means for periodically reciproating said head including an abutment, substantially in alinement with the operating tool, substantially as described.

4. A machine of the class described comprising a frame; a pair of reciprocating rods in said frame; a tool head rotatably mounted on one of said rods and abutting against the other; tool holders on said head arranged to abut against the end of said other rod; guides on said frame, there being notches on the end of said head arranged to ride upon said guides to guide the head during its reciprocations and release it for its rotations; a work holder in operative relation with said head; and means for alternately rotating said head and reciprocating said rods to apply said tools to work in said holder, substantially as described.

5. A machine of the class described comprising a frame; a pair of reciprocating rods in said frame; a tool head rotatably mounted on one of said rods and abutting against the other; tool holders on said head arranged to abut against the end of said other rod; guides on said frame, there being notches on the end of said head arranged to ride upon said guides to guide the head during its reciprocations and release it for its rotations; a work holder in operative relation with said head; means for periodically rotating said head when withdrawn from said guides; and means for periodically reciprocating said rods to carry the tools on said head into operative relation with work in said holder, substantially as described.

6. The combination in an automatic screw machine of a pair of parallel reciprocating rods; a tool holding head rotatably mounted on one of said rods and abutting against the end of the other; and means for periodically reciprocating said rods, substantially as described.

7. The combination in an automatic screw machine of a pair of parallel reciprocating rods; a tool holding head rotatably mounted on one of said rods and abutting against the end of the other; a cross head rigidly connecting said rods and extended therefrom; a cam roller on the extended portion of said cross head; and a cam head carrying cam blocks operating on said roller to periodically reciprocate said rods, substantially as described.

8. The combination in an automatic screw machine of a frame; a rotatable and reciprocable tool head on said frame; a plurality of tool holders on said head; a work holder in operative relation with one position of said tool holders; guides for said head on said frame on opposite sides of the operative position of said tool holders; and means for alternately rotating and reciprocating said head to apply tools thereon to work in said holder, substantially as described.

9. The combination in an automatic screw machine of a frame; a rod mounted to reciprocate on said frame; a tool head rotatable on said rod but moving longitudinally therewith; a plurality of tool holders on said head; a work holder in operative relation with one position of said tool holders; guides for said head on same frame on opposite sides of the operative position of said tool holders; a gear loose on said rod and held from moving therewith; an automatically engaging and disengaging connection between said head and said gear, and means for periodically and alternately operating said rod and said gear, substantially as described.

10. The combination in an automatic screw machine of a frame; a rod mounted to reciprocate on said frame; a tool head rotatable on said rod but moving longitudinally therewith; a plurality of tool holders on said head; a work holder in operative relation with one position of said tool holders; guides for said head on said frame on opposite sides of the operative position of said tool holders; a gear loose on said rod and held from moving therewith; an automatically engaging and disengaging connection between said head and said gear; means for periodically reciprocating said rod; and means for periodically rotating said gear during the periods of engagement with said head, substantially as described.

11. An automatic screw machine, comprising a rotatable and reciprocal tool head; a gear; an automatically engaging and disengaging connection between said head and gear; a longitudinally slidable rack bar meshing with said gear; a spring-held lever operatively connected with said rack bar; and a cam operating on said lever to operate said rack bar, substantially as described.

12. An automatic screw machine, comprising a rotatable and reciprocal tool head; a gear mounted co-axially with said tool head; an automatically engaging and disengaging connection between said head and gear; a longitudinally slidable rack bar meshing with said gear; a spring-held bell crank lever in operative relation with said rack bar; a link connecting one arm of said bell crank lever with said rack bar; a cam roller carried by the other arm of said bell crank lever; and a cam operating on said roller to operate said bell crank lever and said rack bar, substantially as described.

In testimony whereof I have signed my name to this specification in the presence of two subscribing witnesses.

HANS O. HAMMER.

Witnesses:
JOSHUA R. H. POTTS,
BERNARD BERNTSON.